(12) United States Patent
    Tsuchida

(10) Patent No.: US 12,585,993 B2
(45) Date of Patent: *Mar. 24, 2026

(54) MACHINE LEARNING APPARATUS, MACHINE LEARNING SYSTEM, MACHINE LEARNING METHOD, AND PROGRAM

(71) Applicant: NEC Corporation, Tokyo (JP)

(72) Inventor: Hikaru Tsuchida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 708 days.

This patent is subject to a terminal disclaimer.

(21) Appl. No.: 17/923,714

(22) PCT Filed: May 15, 2020

(86) PCT No.: PCT/JP2020/019424
    § 371 (c)(1),
    (2) Date: Nov. 7, 2022

(87) PCT Pub. No.: WO2021/229791
    PCT Pub. Date: Nov. 18, 2021

(65) Prior Publication Data
    US 2023/0177393 A1      Jun. 8, 2023

(51) Int. Cl.
    *G06N 20/00*        (2019.01)
(52) U.S. Cl.
    CPC .................................... *G06N 20/00* (2019.01)
(58) Field of Classification Search
    CPC .......... G06N 20/00; G06N 3/08; G06N 3/045; G06N 3/084
    See application file for complete search history.

(56) References Cited

U.S. PATENT DOCUMENTS

| | | | |
|---|---|---|---|
| 10,225,277 B1 | 3/2019 | Shintre et al. | |
| 2014/0153803 A1 | 6/2014 | Noda et al. | |
| 2017/0309019 A1* | 10/2017 | Knoll ................. | G01R 33/5611 |
| 2019/0287016 A1 | 9/2019 | Kato et al. | |
| 2021/0174154 A1* | 6/2021 | Duncan .................. | G16H 50/20 |
| 2023/0056772 A1* | 2/2023 | Zhu ........................... | G06N 3/08 |
| 2023/0214666 A1* | 7/2023 | Tsuchida ................ | G06N 3/045 |
| | | | 706/15 |

FOREIGN PATENT DOCUMENTS

| | | |
|---|---|---|
| JP | 2014-128576 A | 7/2014 |
| JP | 2019-049975 A | 3/2019 |
| JP | 2019-159835 A | 9/2019 |
| JP | 2020-021301 A | 2/2020 |
| WO | 2020/097182 A1 | 5/2020 |

OTHER PUBLICATIONS

International Search Report for PCT Application No. PCT/JP2020/019424, mailed on Aug. 4, 2020.

(Continued)

*Primary Examiner* — Jason Salce
(74) *Attorney, Agent, or Firm* — Sughrue Mion, PLLC

(57) ABSTRACT

A machine learning apparatus includes an influence function calculation part which calculates an influence function indicating sensitivity that input data has on parameters of a target model and a target model training part which trains the target model using the influence function as a regularization term.

17 Claims, 7 Drawing Sheets

(56) References Cited

OTHER PUBLICATIONS

Shokri et a., "Membership Inference Attacks Against Machine Learning Models", IEEE Symposium on Security and Privacy 2017: 3-18, <URL:https://arxiv.org/pdf/1610.05820.pdf>.
Jia et al., "MemGuard: Defending against Black-Box Membership Inference Attacks via Adversarial Examples", <URL: https://arxiv.org/pdf/1909.10594.pdf>.
Nasr et al., "Machine Learning with Membership Privacy using Adversarial Regularization" <URL: https://arxiv.org/pdf/1807.05852.pdf>.
Koh et al, "Understanding Black-box Predictions via Influence Functions" <URL:https://arxiv.org/pdf/1703.04730.pdf>.
JP Office Action for JP Application No. 2022-522469, mailed on Oct. 3, 2023 with English Translation.

* cited by examiner

MACHINE LEARNING APPARATUS, MACHINE LEARNING SYSTEM, MACHINE LEARNING METHOD, AND PROGRAM

This application is a National Stage Entry of PCT/JP2020/019424 filed on May 15, 2020, the contents of all of which are incorporated herein by reference, in their entirety.

FIELD

The present invention relates to a machine learning apparatus, a machine learning system, a machine learning method, and a program.

BACKGROUND

A membership interference attack (MI attack) which leaks secret information (for example: customer information, trade secret, and so on) used for training from trained parameters by machine learning is known (refer to Non-Patent Literature (NPL) 1). For example, in NPL 1, an experiment was carried out using data assembled by the Texas Department of State Health Service in USA, and it is pointed out that if certain data is used for training, it can be said that a level of confidence of an inference to the data is high but there are concerns about undermining privacy of a person corresponding to the data.

Although other methods for MI attacks are released, in most of them, data x is queried to a target model and outputted scores therefrom are used for attacks. Concretely, an inference (attack) is performed by a binary classifier (discriminator) which accepts a score concerning data x and classifies whether the data x is data used for training or not.

NPL 2 discloses MemGuard which is a method to perform a processing of adding noise to scores outputted from a target model, as defense against black-box attacks under a condition where trained parameters of an attack target model are not known.

Furthermore, Temperature scaling, DP-SGD (Differential Privacy-Stochastic Gradient Descent), regularization, Dropout, and so on are known, as defense against white-box attacks under a condition where trained parameters of a target model are known to attackers.

NPL 3 is a document which discloses Adversarial Regularization which is a method classified as one method of regularization. Concretely, the method of NPL 3 uses an algorithm which uses a binary classifier virtually performing MI attacks and adds its gain as a regularization term, during training. By this, a method of increasing robustness to MI attacks is employed by repeating min-max, in which (1) minimization of a gain of the binary classifier+a loss function and (2) maximization of the gain of the binary classifier.

In NPL 4, attempt to identify training points most responsible for a given output is carried out, by tracing an output of a target model through "a learning algorithm" and backing to its training data, using influence functions used in robust statistics.

Patent Literature (PTL) 1 discloses a training data evaluation apparatus which can evaluate contributions of training data to requirements for identifying an inference target. Concretely, this training data evaluation apparatus splits training data into a plurality of batch data and performs training of a model by sequentially using the plurality of batch data. Then, this training data evaluation apparatus stores each model in the process of being changed by sequentially applying the batch data thereto, and information of the batch data generating each model. This training data evaluation apparatus has a function to apply test data to the plurality of stored models, evaluate each model, and select batch data based on evaluation results of each model.

PTL 1: Japanese Patent Kokai Publication No. 2020-21301A

NPL 1: Reza Shokri, Marco Stronati, Congzheng Song, Vitaly Shmatikov: "Membership Inference Attacks Against Machine Learning Models", IEEE Symposium on Security and Privacy 2017: 3-18, [online], [searched on Apr. 21, 2020], Internet <URL: https://arxiv.org/pdf/1610.05820.pdf>

NPL 2: Jinyuan Jia, Ahmed Salem, Michael Backes, Yang Zhang, Neil Zhenqiang Gong, "MemGuard: Defending against Black-Box Membership Inference Attacks via Adversarial Examples", [online], [searched on Apr. 21, 2020], Internet <URL: https://arxiv.org/pdf/1909.10594.pdf>

NPL 3: Milad Nasr, Reza Shokri, Amir Houmansadr, "Machine Learning with Membership Privacy using Adversarial Regularization", [online], [searched on Apr. 21, 2020], Internet <URL: https://arxiv.org/pdf/1807.05852.pdf>

NPL 4: Pang Wei Koh, Percy Liang, "Understanding Black-box Predictions via Influence Functions", [online], [searched on Apr. 21, 2020], Internet <URL: https://arxiv.org/pdf/1703.04730.pdf>

SUMMARY

The following analysis has been given by the present inventor. FIGS. 5 and 6 of NPL 2 show comparison results of MemGuard and major defenses against MI attacks. Inference Accuracy of the ordinate in the Figures indicates probability of success of inference of Member data (data used for training) by attackers. MemGuard of NPL 2 shows high performance in any of Average Confidence Score Distortion and Label Loss. However, MemGuard is defense against black-box attacks. Remaining four methods are defenses against white-box attacks and Min-Max game corresponding to Adversarial Regularization of NPL 3 has an advantage.

However, there is a problem in the method of NPL 3 that, in the process of updating parameters of a target model, it is necessary to prepare a binary classifier which receives an output from the target model and to perform processing of maximizing its gain ("Inference model h" in FIG. 1 of NPL3).

It is an object of the present invention to provide a machine learning apparatus, a machine learning system, a machine learning method, and a program which can contribute to efficiently increase robustness against MI attacks to a target model.

According to a first aspect, there is provided a machine learning apparatus, including: an influence function calculation part which calculates an influence function indicating sensitivity that input data has on parameters of a target model; and a target model training part which trains the target model using the influence function as a regularization term.

According to a second aspect, there is provided a machine learning system, through a network, connecting: an influence function calculation apparatus which calculates an influence function indicating sensitivity that input data has on parameters of a target model; and a target model training apparatus which trains the target model using the influence function as a regularization term.

According to a third aspect, there is provided a machine learning method, including: calculating an influence function indicating sensitivity that input data has on parameters of a target model; and training the target model using the influence function as a regularization term. The method as described above is tied to a particular machine, namely, a computer which updates a target model f using training data According to a fourth aspect, there is provided a computer program for realizing above computer functions. This program is inputted to a computer apparatus through an input device or a communication interface from the outside, is stored in a storage device, causes a processor to execute according to predetermined steps or processings, is able to display processing results including intermediate states in a step-by-step fashion on a display if necessary, and is able to communicate with outside through the communication interface. The computer apparatus therefor typically includes, as an example, a processor, a storage device, an input device, a communication interface, and a display device, if necessary, which are mutually connectable by a bus. It is to be noted that these programs can be recorded on a computer-readable (non-transitory) storage medium.

According to the present invention, it is possible to efficiently increase robustness against MI attacks to a target model.

EXAMPLE EMBODIMENTS

Figure 1:
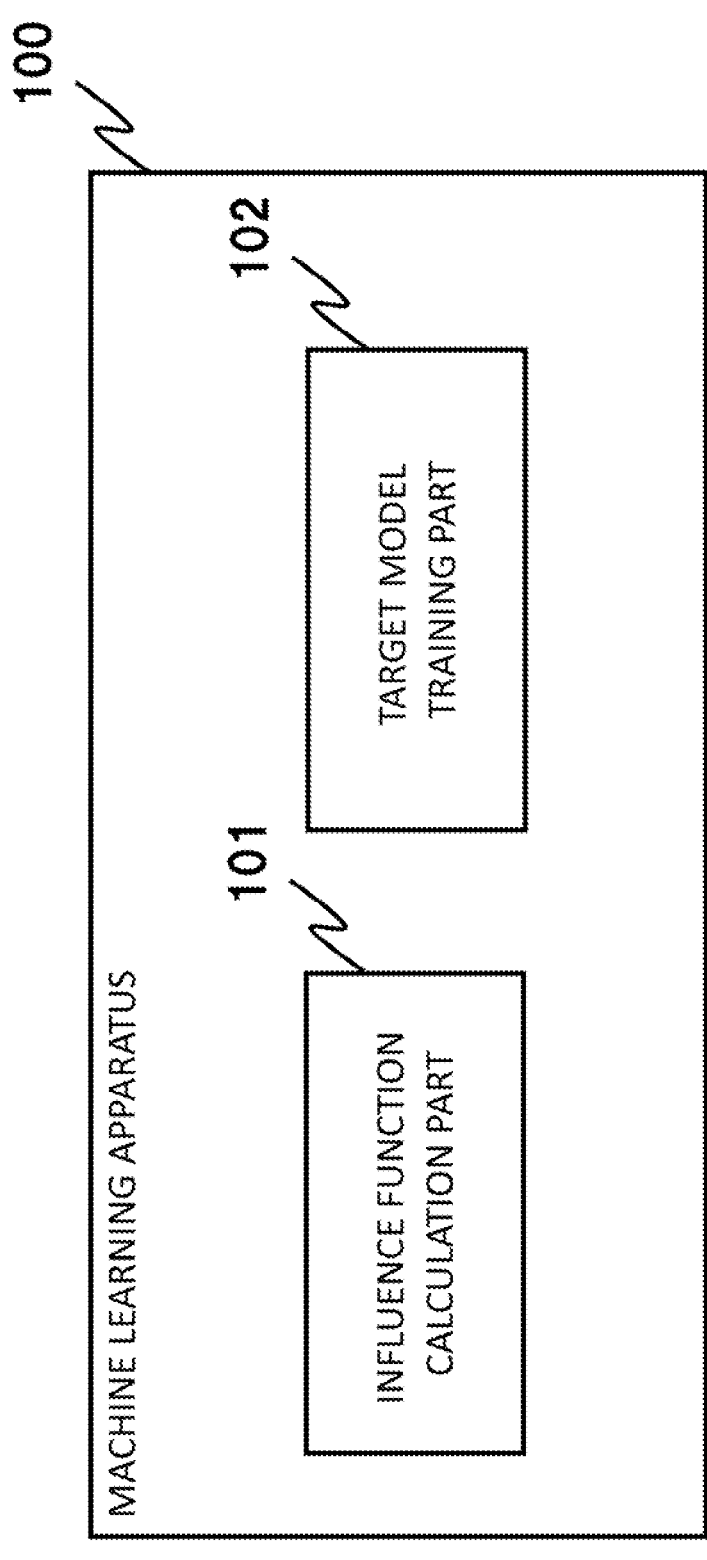
FIG. 1 illustrates an configuration according to an example embodiment of the present invention.

First, an outline of an example embodiment of the present invention will be described with reference to drawings. Note, in the following outline, reference signs of the drawings are denoted to each element as an example for the sake of convenience to facilitate understanding and description of this outline is not intended to limit the present invention to embodiments as shown in drawings. An individual connection line between blocks in drawings referred to in the following description includes both one-way and two-way directions. A one-way arrow schematically illustrates a principal signal (data) flow and does not exclude bidirectionality. A program is executed through a computer apparatus and the computer apparatus includes, for example, a processor, a storage device, an input device, a communication interface, and a display device if necessary. Furthermore, the computer apparatus is configured to be able to communicate with devices within the apparatus or external devices (including computers) through the communication interface, by wired or by wireless. Furthermore, while not illustrated, a port(s)

or an interface(s) exists at an input-output connection point(s) in an individual block in the drawings. In addition, "A and/or B" in the following description signifies at least one of A or B.

In an example embodiment as illustrated in FIG. 1, the present invention can be realized by a machine learning apparatus 100 which includes an influence function calculation part 101 and a target model training part 102. More concretely, the influence function calculation part 101 calculates an influence function indicating sensitivity (a degree of influence) that input data has on parameters of a target model.

The target model training part 102 trains the target model using the influence function as a regularization term. A training algorithm of the target model in the target model training part 102 can be represented by a following expression (1). Here, $L_D(f)$ indicates a loss function of the target model f whose input is training data D and $\lambda$ indicates a hyperparameter. In the expression (1), an absolute value of a influence function $I_f(x_i, x_i)$ of training data x is used as a regularization term.

$$\min_f (L_D(f) + |\lambda I_f(x_i, x_i)|) \tag{1}$$

By learning the parameters of the target model to minimize the above expression (1) for the predetermined batch size, it is possible to train the target model f in a direction to minimize both variation of inference result depending on whether certain data is used for training or not and an error of inference itself.

Furthermore, as is clear from the expression (1), according to the expression (1), a processing for maximizing a gain of the regularization term is not necessary. This means that an attack discriminator as represented by a binary discriminator is not necessary. As a result, according to the present invention, it becomes possible to efficiently increase robustness against MI attacks to the target model.

First Example Embodiment

Figure 2:
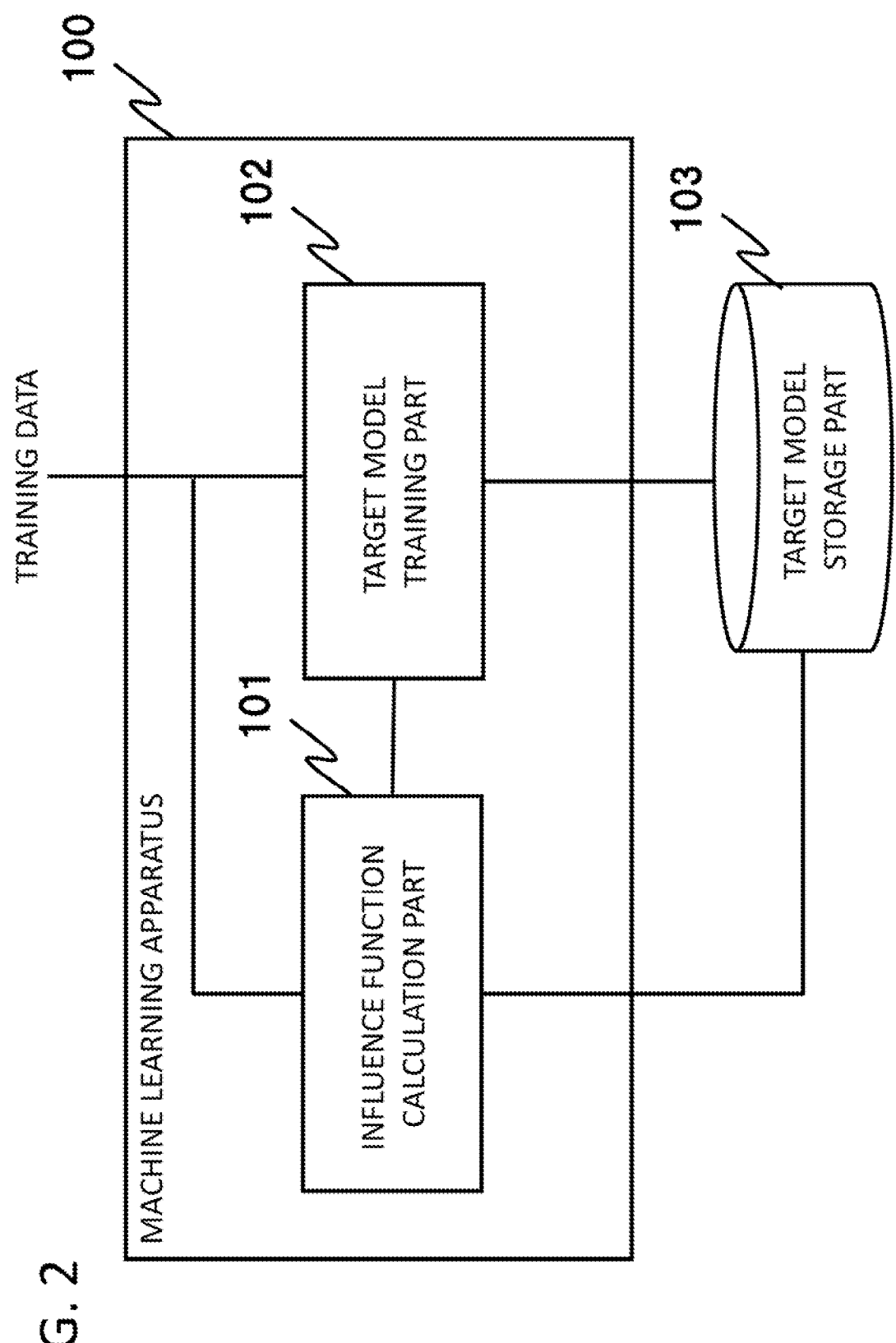
FIG. 2 is a block diagram illustrating a configuration of a machine learning apparatus according to a first example embodiment of the present invention.

Next, a first example embodiment of the present invention will be described in detail with reference to drawings. FIG. 2 is a block diagram illustrating a configuration of a machine learning apparatus according to a first example embodiment of the present invention. With reference to FIG. 2, a configuration of the machine learning apparatus 100 which is configured to be accessible to a target model storage part 103 is illustrated.

The machine learning apparatus 100 includes an influence function calculation part 101 and a target model training part 102. The target model storage part 103 stores a target model which is a target of training.

The influence function calculation part 101 reads out the target model from the target model storage part 103, calculates an influence function indicating sensitivity that input data (training data) has on parameters of the target model, and passes a calculated result to the target model training part 102.

The influence function calculated by the influence function calculation part can be represented by a following expression (2)

$$I_f(x,x) = \theta_{-x} - \theta \tag{2}$$

where let the parameters of the target model be $\theta$, let parameters be $\theta_{-x}$ when the input data x is not used in learning the target model. Please note that, as more concrete calculation methods of the influence function, various methods proposed in NPL 4 can be used.

The target model training part 102 performs training of the target model stored in the target model storage part 103 using an algorithm which uses the above influence function as a regularization term. The training of the target model can be realized by the algorithm below.

(1) Sampling training data whose batch size is m from training data is carried out. Here, the training data to be sampled can be described by a following expression (3). Here, $x_i$ is data, $y_i$ is a label (correct answer label) (for classification of k classes, {0, 1} in case of binary).

$$\{(x_i, y_i)\}_{i=1}^{m}(x_i \in \mathbb{R}^n, y_i \in \{1, \ldots, k\}) \tag{3}$$

(2) Calculation of gradients concerning parameters θ of the target model f by a following expression (4) which uses the above influence function $I_f(x_i, x_i)$ as the regularization term is carried out. Please note that $l(f(x_i), y_i)$ in the expression (4) represents a loss function and ∇ represents nabla (=differentiation for each component).

$$\nabla_\theta \frac{1}{m} \sum_{i=1}^{m} l(f(x_i), y_i) + \lambda I_f(x_i, x_i) \tag{4}$$

(3) Updating θ in a direction that the expression (4) becomes small using a gradient descent method is carried out.
(4) θ obtained by carrying out processings of the above (1) through (3) for the number of batches are outputted.

Please note that, although, in the above algorithm, it is described to train θ from an initial value, θ may have been trained using training data beforehand.

Figure 3:
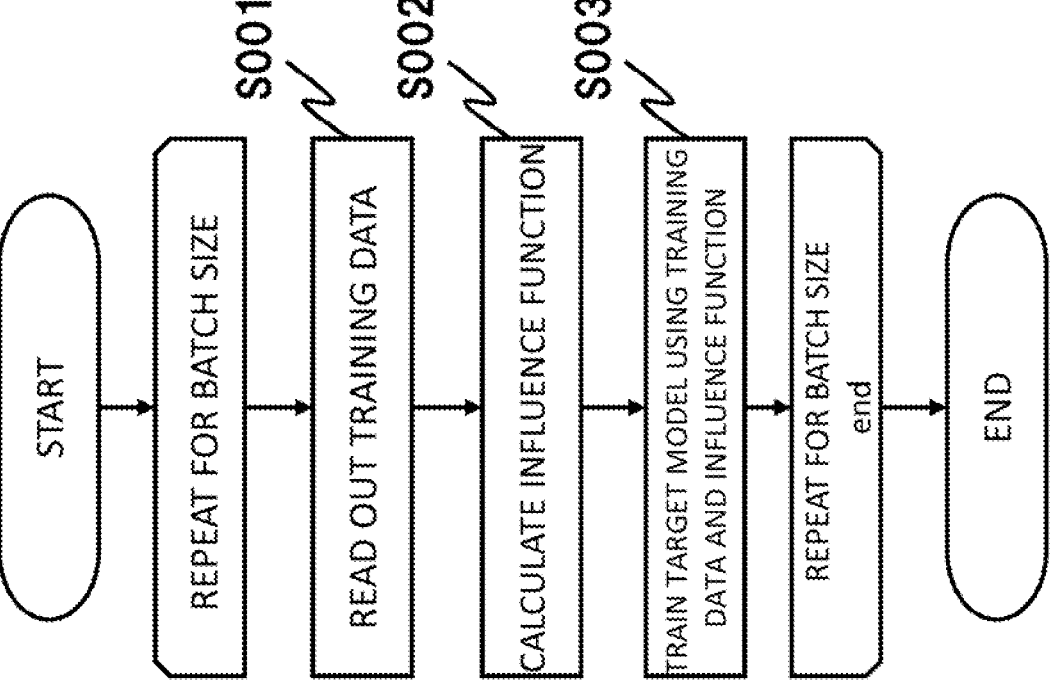
FIG. 3 is a flowchart illustrating operations of the machine learning apparatus according to the first example embodiment of the present invention.

Next, whole operation of the machine learning apparatus according to this example embodiment will be explained. FIG. 3 is a flowchart illustrating operations of the machine learning apparatus 100 according to the first example embodiment of the present invention. With reference to FIG. 3, first, the machine learning apparatus 100 reads out training data $(x_i, y_i)$ (step S001).

Next, the machine learning apparatus 100 calculates an influence function indicating sensitivity that $x_i$ has on parameters θ of a target model (step S002).

Next, the machine learning apparatus 100 trains the target model by calculating gradient concerning the parameters θ using the training data $(x_i, y_i)$ and the influence function as calculated above (step S003).

The processings of the above steps S001 to S003 are repeated for a predetermined batch size m and the parameters θ of the target model stored in the target model storage part 103 are updated.

According to the expression (2) and the expression (4) as described above, it can be said that the influence function has characteristics below.

In a case where the influence function $I_f(z, z')$ has a positive value
    when certain data z has not been used for training, a loss becomes large at the time of inference of z'. This indicates that such certain data z is helpful in training (referred to helpful data).
In a case where the influence function $I_f(z, z')$ has a negative value
    when certain data z has not been used for training, a loss becomes small at the time of inference of z'. This indicates that such certain data z is not helpful in training but is harmful (referred to harmful data).

In a case where the influence function $I_f(z, z')$ has a value of zero (0)
    when certain data z has not been used for training, a loss is unchanged at the time of inference of z'. This indicates that an inference result is not changed regardless of whether such certain data z is used in training or not.

The following is derived from discussions as described above. It is not possible to identify whether the data $x_i$ is a data used in training (Member data) or not from the inference result (output) of a target model having parameters θ trained by an algorithm using the influence function $I_f(x_i, x_i)$ as a regularization term. Therefore, it can be said that the target model f having the parameters θ updated by using the algorithm as described above has robustness against MI attacks.

For example, it is assumed that a score y is obtained as an inference result when x is inputted to the target model f. Because this target model has been trained by the algorithm using the influence function $I_f(x_i, x_i)$ as the regularization term, the score y has the same value regardless of whether x has been used as training data or not. Therefore, an attacker of MI attacks is practically impossible to infer whether x has been used as training data or not from the score y.

Second Example Embodiment

In the description of the first example embodiment, it is assumed that the influence function calculation part 101 and the target model training part 102 are included in a single apparatus (the machine learning apparatus 100). However, the influence function calculation part 101 and the target model training part 102 may respectively be configured by discrete apparatuses. Next, the second example embodiment in which the influence function calculation part 101 and the target model training part 102 are respectively configured by discrete apparatuses will be explained. Because the basic functions thereof are the same as those in the first example embodiment, difference from the first example embodiment will mainly be explained below.

Figure 4:
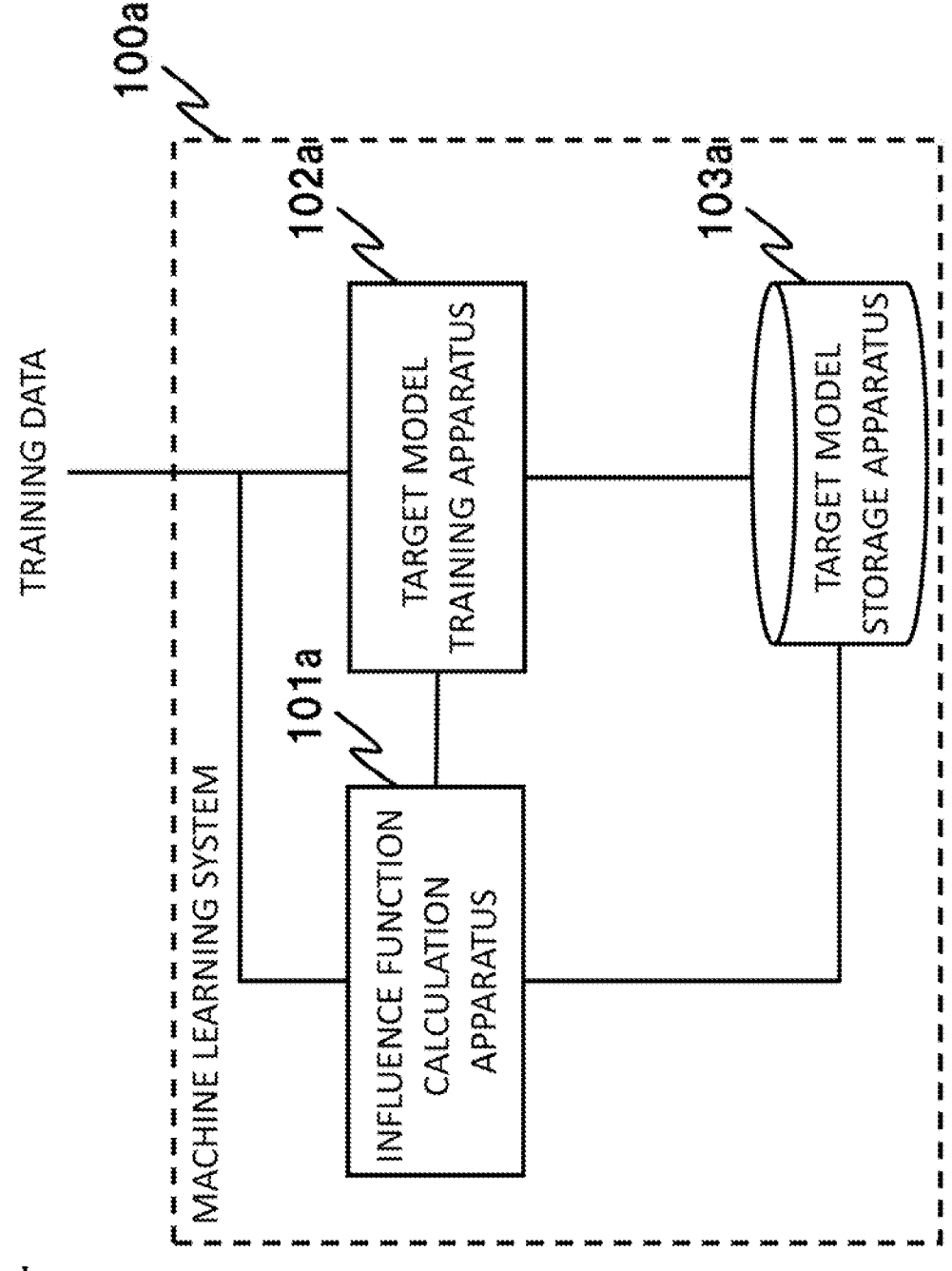
FIG. 4 is a block diagram illustrating a configuration of a machine learning system according to a second example embodiment of the present invention.

FIG. 4 is a block diagram illustrating a configuration of a machine learning system according to a second example embodiment of the present invention. With reference to FIG. 4, a machine learning system 100*a* which is made up of an influence function calculation apparatus 101*a*, a target model training apparatus 102*a*, and a target model storage apparatus 103*a* connected each other via a network is shown.

The influence function calculation apparatus 101*a*, the target model training apparatus 102*a*, and the target model storage apparatus 103*a* respectively correspond to an influence function calculation part 101, a target model training part 102, and a target model storage part 103 according to the first example embodiment. Because operations of respective apparatuses are equivalent to those of the influence function calculation part 101, the target model training part 102, and the target model storage part 103, explanation will be omitted.

Figure 5:
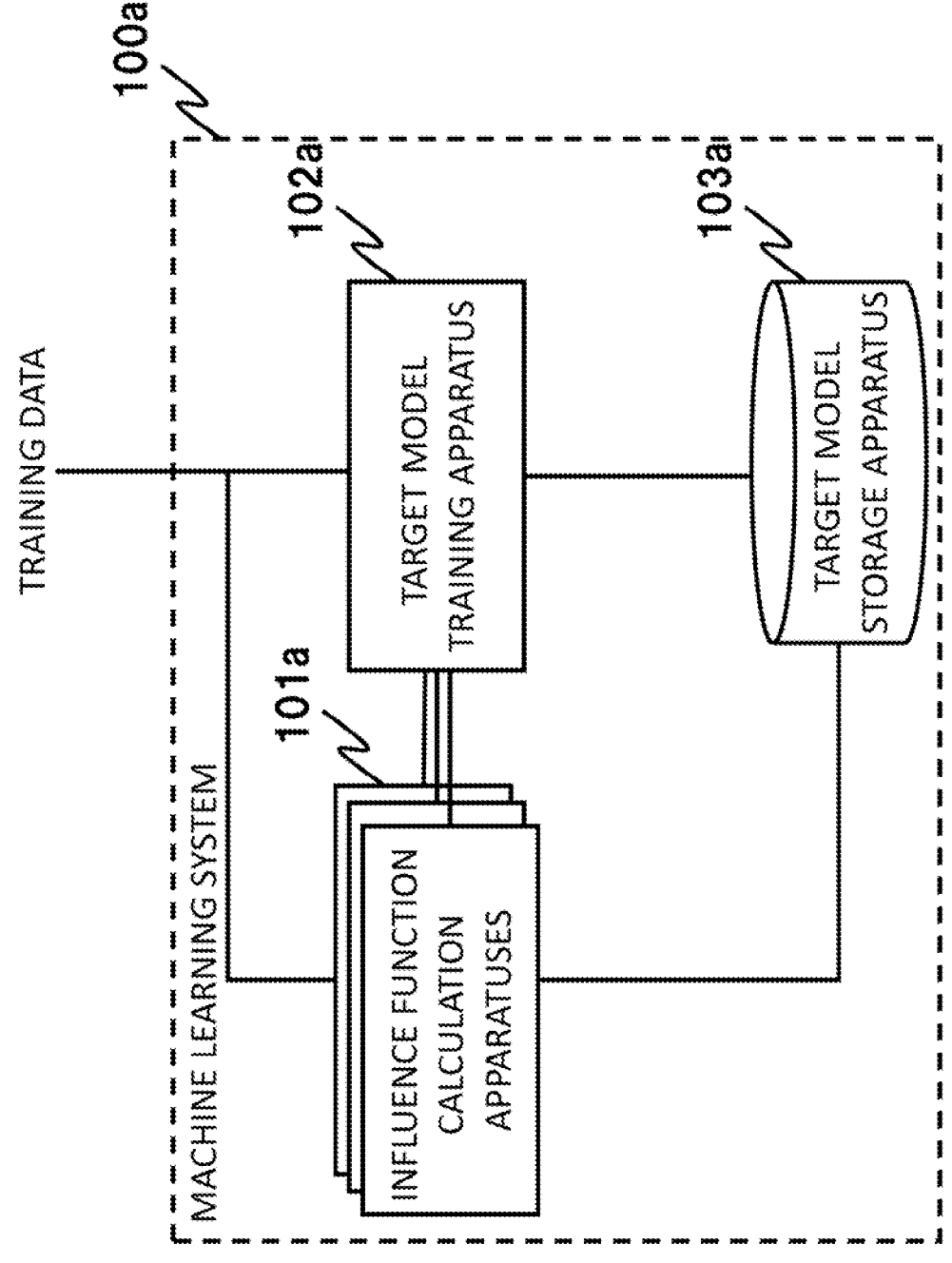
FIG. 5 is a block diagram illustrating a configuration of a modified example according to the second example embodiment of the present invention.

As described above, the present invention can be realized by a configuration connecting a plurality of apparatuses each other. Furthermore, as shown in FIG. 5 and FIG. 6, it is possible to employ a configuration in which multiple influence function calculation apparatuses 101*a* and multiple target model training apparatuses 102*a* are arranged.

It is calculation of the influence function that has a relatively high calculation cost common to the first and second example embodiments. Furthermore, the number of target models required to be continuously updated is not always one. For example, as shown in FIG. 5, by preparing a plurality of influence function calculation apparatuses 101*a* and sharing processings among them, it is possible to alleviate a load of each of influence function calculation apparatuses 101*a*. Of course, it is possible to employ a configuration in which each of a plurality of influence function calculation apparatuses 101*a* calculates an influence function of each target model, and to also employ a configuration in which a plurality of influence function calculation apparatuses 101*a* cooperate and calculate an influence function of a particular target model.

Figure 6:
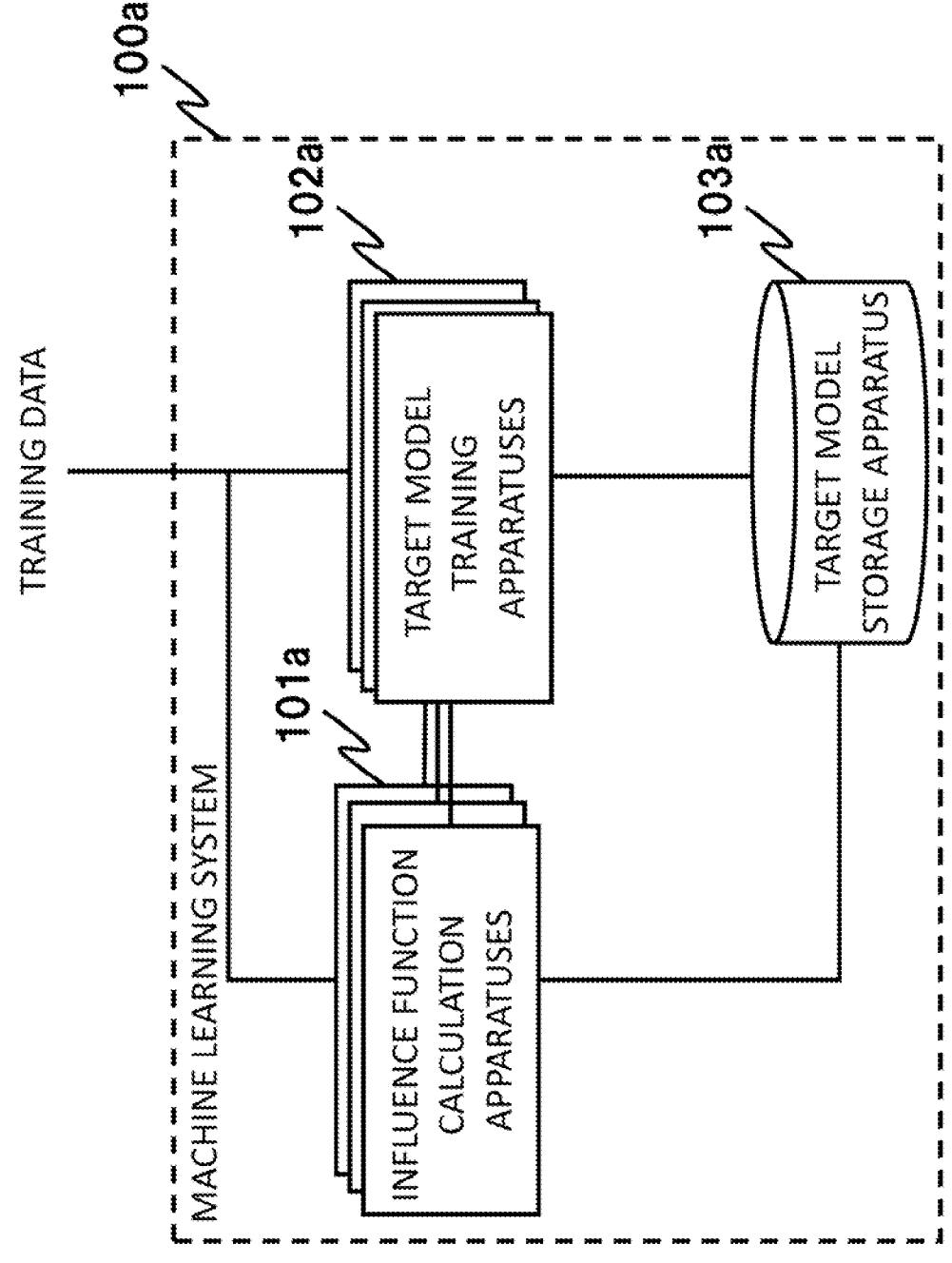
FIG. 6 is a block diagram illustrating a configuration of a modified example according to the second example embodiment of the present invention.

Furthermore, as shown in FIG. 6, it is possible to employ a configuration in which a plurality of target model training apparatuses 102*a* are arranged. It is possible to employ a configuration in which the plurality of these target model training apparatuses 102*a* operate in association with any of a plurality of influence function calculation apparatuses 101*a* and to also employ a configuration in which a plurality of target model training apparatuses 102*a* cooperate and train a particular target model. Note that, according to a third aspect, there is provided a machine learning method, comprising:

calculating an influence function indicating sensitivity that input data has on parameters of a target model; and training the target model using the influence function as a regularization term.

The example embodiments of the present invention have been described as above, however, the present invention is not limited thereto. Further modifications, substitutions, or adjustments can be made without departing from the basic technical concept of the present invention. For example, the configurations of the systems and the elements and the representation modes of the data illustrated in the individual drawings are merely used as examples to facilitate the understanding of the present invention. Thus, the present invention is not limited to the configurations illustrated in the drawings.

Figure 7:
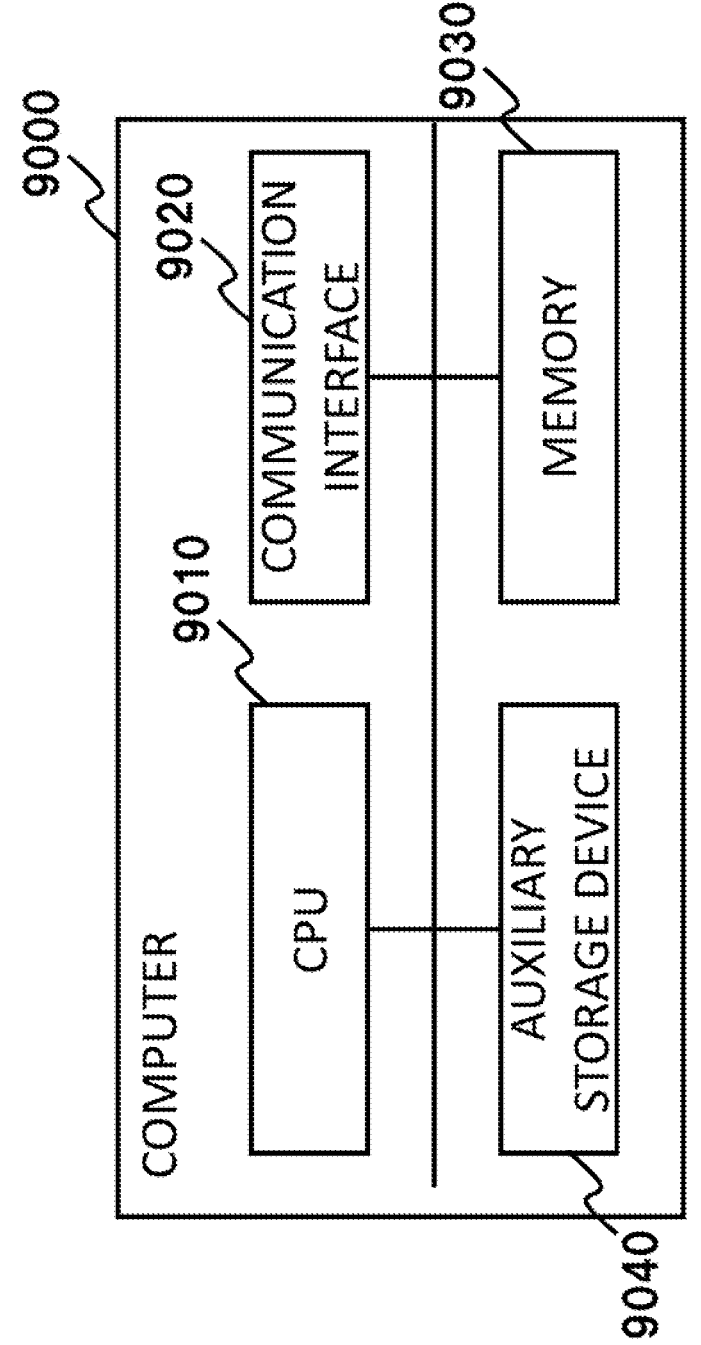
FIG. 7 illustrates a configuration of a computer making up of a machine learning apparatus of the present invention.

The procedures according to the above example embodiments can be realized by a program that causes a computer (9000 in FIG. 7) functioning as a machine learning apparatus or apparatuses making up of a machine learning system. Such computer is illustrated by a configuration, as an example, including a CPU (central processing unit) 9010, a communication interface 9020, a memory 9030, and an auxiliary storage device 9040 in FIG. 7. Namely, the CPU 9010 in FIG. 7 may be configured to execute an influence function calculation program or a target model training program and to perform processing for updating various calculation parameters stored in the auxiliary storage device 9040 or the like.

Namely, learning processings of a machine learning system and inference processings obtained by the learning according to the above example embodiments may be realized by a computer program that causes a processor mounted on these apparatuses to perform the corresponding processing described above by using its hardware.

The disclosures of the above Patent Literature and the Non-Patent Literatures are incorporated herein by reference thereto and is considered to be described therein, and can be used as a basis and a part of the present invention if needed. Variations and adjustments of the example embodiments and examples are possible within the scope of the overall disclosure (including the claims) of the present invention and based on the basic technical concept of the present invention. Various combinations and selections (including partial deletion) of various disclosed elements (including the elements in each of the claims, example embodiments, examples, drawings, etc.) are possible within the scope of the entire disclosure of the present invention. Namely, the present invention of course includes various variations and modifications that could be made by those skilled in the art according to the overall disclosure including the claims and the technical concept. In particular, with respect to the numerical ranges described herein, any numerical values or small range(s) included in the ranges should be construed as being expressly described even if not particularly mentioned. In addition, each disclosure of above cited documents and also using a part or all thereof by combining with the disclosure of the present application are regarded as being included in the disclosure of the present application, as necessary, in accordance with the intent of the present invention, as a part of the disclosure of the present invention.

REFERENCE SIGNS LIST

100 machine learning apparatus
100*a* machine learning system
101 influence function calculation part
101*a* influence function calculation apparatus
102 target model training part
102*a* target model training apparatus
103 target model storage part
103*a* target model storage apparatus
9000 computer
9010 CPU
9020 communication interface
9030 memory
9040 auxiliary storage device

What is claimed is:

1. A machine learning apparatus, comprising:
at least one processor; and
memory storing instructions,
wherein the instructions, when executed by the at least one processor, cause the machine learning apparatus to:
receive a training set of labeled data points; and
train a target model stored on a storage based on the training set, wherein the training comprises, for an input data point:
calculating an influence function indicating a level of sensitivity that the input data point has on parameters of the target model;
calculating a regularization gradient based on a result of the influence function;
updating the parameters of the target model based on the regularization gradient; and
storing the target model with the updated parameters on the storage,
wherein the influence function is defined by the expression $$I_f(x,x) = \theta_{-x} - \theta$$

where x represents the input data point, $\theta$ represents the values of the parameters in the trained target model when the input data point is included in the training, and $\theta_{-x}$ represents the values of the parameters in the trained target model when the input data point is excluded from the training.

2. The machine learning apparatus according to claim 1, wherein the parameters of the target model are trained from an initial value.

3. The machine learning apparatus according to claim 1, wherein the parameters of the target model have been trained using training data beforehand.

4. The machine learning apparatus according to claim 1, wherein the calculation of the influence function and the updating of the parameters contribute to minimizing both variation of inference results depending on whether certain data is used for training or not and an error of inference itself, for a predetermined batch size of training data.

5. The machine learning apparatus according to claim 1, wherein the updating of the parameters directly suppresses the influence of the input data point on the parameters of the target model by using the influence function, thereby increasing robustness against membership inference attacks.

6. The machine learning apparatus according to claim 1, wherein the regularization gradient is calculated based on a combination of the influence function and a loss function indicating an inference error of the target model.

7. A machine learning system, through a network, connecting:

an influence function calculation apparatus comprising:

at least one first processor; and memory storing first instructions, wherein the first instructions, when executed by the at least one first processor cause the influence function calculation apparatus to calculate an influence function indicating a level of sensitivity that an input data point has on parameters of a target model stored in a storage; and a target model training apparatus comprising:

at least one second processor; and memory storing second instructions, wherein the second instructions, when executed by the at least one second processor, cause the target model training apparatus to:

receive a training set of labeled data points; and train the target model stored on the storage based on the training set, wherein the training comprises, for an input data point:

calculating a regularization gradient based on a result of the influence function received from the influence function calculation apparatus;

updating the parameters of the target model based on the regularization gradient; and storing the target model with the updated parameters on the storage, wherein the influence function is defined by the expression $$I_f(x,x) = \theta_{-x} - \theta$$

where x represents the input data point, $\theta$ represents the values of the parameters in the trained target model when the input data point is included in the training, and $\theta_{-x}$ represents the values of the parameters in the trained target model when the input data point is excluded from the training.

8. The machine learning system according to claim 7, wherein a plurality of the influence function calculation apparatuses are arranged.

9. The machine learning system according to claim 7, wherein the parameters of the target model are trained from an initial value.

10. The machine learning system according to claim 7, wherein the parameters of the target model have been trained using training data beforehand.

11. The machine learning system according to claim 7, wherein the influence function calculation apparatus is configured to reduce the computational cost of calculating the influence function through distributed processing, and the target model training apparatus utilizes results of the influence function provided from a plurality of influence function calculation apparatuses via the network.

12. The machine learning system according to claim 7, wherein the target model training apparatus trains the target model by optimizing a combination of an objective function for minimizing an inference error of the target model and the influence function used as a regularization term.

13. A non-transient computer-readable recording media storing a program that, when executed by at least one processor of a computer causes the at least one processor to perform:

receiving a training set of labeled data points; and training a target model stored on a storage based on the training set, wherein the training comprises, for an input data point:

calculating an influence function indicating a level of sensitivity that the input data point has on parameters of the target model;

calculating a regularization gradient based on a result of the influence function;

updating the parameters of the target model based on the regularization gradient; and storing the target model with the updated parameters on the storage, wherein the influence function is defined by the expression $$I_f(x,x) = \theta_{-x} - \theta$$

where x represents the input data point, $\theta$ represents the values of the parameters in the trained target model when the input data point is included in the training, and $\theta_{-x}$ represents the values of the parameters in the trained target model when the input data point is excluded from the training.

14. The computer-readable non-transient recording media according to claim 13, wherein the parameters of the target model are trained from an initial value.

15. The computer-readable non-transient recording media according to claim 13, wherein the parameters of the target model have been trained using training data beforehand.

16. The non-transient computer-readable recording media according to claim 13, wherein the program includes instructions to evaluate variation in parameters of the target model from a predetermined batch of training data using the influence function, and to update the parameters to minimize a combination of an inference error of the target model and said evaluated variation.

17. The non-transient computer-readable recording media according to claim 13, wherein the program includes instructions to directly increase robustness of the target model against membership inference attacks by using the influence function as a regularization term during the updating of the parameters of the target model.

* * * * *